United States Patent
Shoji et al.

(10) Patent No.: US 11,172,051 B2
(45) Date of Patent: Nov. 9, 2021

(54) COMMUNICATION DEVICE

(71) Applicant: Hitachi Kokusai Electric Inc., Tokyo (JP)

(72) Inventors: Tomoya Shoji, Kodaira (JP); Michitomo Suzuki, Kodaira (JP); Nobuyuki Uchikawa, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/644,301

(22) PCT Filed: Sep. 19, 2017

(86) PCT No.: PCT/JP2017/033704
§ 371 (c)(1),
(2) Date: Mar. 4, 2020

(87) PCT Pub. No.: WO2019/058418
PCT Pub. Date: Mar. 28, 2019

(65) Prior Publication Data
US 2021/0051216 A1    Feb. 18, 2021

(51) Int. Cl.
*H04L 29/06* (2006.01)
(52) U.S. Cl.
CPC .................... *H04L 69/04* (2013.01)
(58) Field of Classification Search
CPC ........ H04L 69/04; H04L 69/22; H04W 84/18; H04W 28/06
See application file for complete search history.

(56) References Cited

U.S. PATENT DOCUMENTS

2010/0128727 A1*  5/2010  Takechi ............... H04L 69/04
                                                     370/392
2011/0158166 A1*  6/2011  Lee ....................... H04L 69/04
                                                     370/328
(Continued)

FOREIGN PATENT DOCUMENTS

JP    2010-130175 A    6/2010
JP    2012-169729 A    9/2012
(Continued)

OTHER PUBLICATIONS

International Search Report of PCT/JP2017/033704 dated Dec. 5, 2017.
(Continued)

*Primary Examiner* — Abdullahi E Salad
(74) *Attorney, Agent, or Firm* — Mattingly & Malur, PC

(57) ABSTRACT

A communication device used in a wireless system that includes plural communication devices and executes communication via at least one of the plural communication devices. The communication device includes: first means for judging whether communication control information can be compressed or not on the basis of a neighboring node search message among the plural communication devices and a response thereto, or the exchange of routing control information according to an ad hoc routing protocol; and second means for compressing the information volume of the communication control information by judging the contents of the communication control information and deleting or replacing redundant information or constantly fixed information if the communication control information can be compressed.

4 Claims, 12 Drawing Sheets

(56) References Cited

U.S. PATENT DOCUMENTS

2016/0142321 A1* 5/2016 Gage .................. H04L 47/18
                                                        370/235
2018/0376368 A1   12/2018 Shoji et al.

FOREIGN PATENT DOCUMENTS

| JP | 2013-502187 A  | 1/2013  |
| JP | 2013-110521 A  | 6/2013  |
| JP | 2015-109544    | 6/2015  |
| JP | 2016-025401 A  | 2/2016  |
| WO | 2017/098859 A1 | 10/2018 |

OTHER PUBLICATIONS

Japanese Office Action received in corresponding Japanese Application No. 2019-542835 dated Mar. 2, 2021.
Shelby, Z. et al., "Neighbor Discovery Optimization for IPv6 over Low-Power Wireless Personal Area Networks (6LoWPANs)", Internet Engineering Task Force (IETF), Nov. 2012, pp. 1-15.
Hui, J. et al., "Compression Format for IPv6 Datagrams over IEEE 802.15.4-Based Networks", Internet Engineering Task Force (IETF), Sep. 2011, pp. 1-10.
Japanese Office Action received in corresponding Japanese Application No. 2019-542835 dated Aug. 31, 2021.

* cited by examiner

FIG.6

| 0 1 2 3 | 4 5 6 7 8 9 10 11 | 12 13 14 15 16 17 18 19 20 21 22 23 24 25 26 27 28 29 30 31 |
|---|---|---|
| IPv6 Version | Traffic Class | Flow Label |
| Payload Length | | Next Header | Hop Limit |
| Source Address | | |
| Destination Address | | |

FIG.7

| 0 1 2 3 4 5 6 7 | 8 9 10 11 12 13 14 15 | 16 17 18 19 20 21 22 23 24 25 26 27 28 | 29 30 | 31 |
|---|---|---|---|---|
| Next Header | RSV | Fragment Offset | RSV | Flag |
| Identification | | | | |

FIG.8

| 0 1 2 3 4 5 6 7 8 9 10 11 12 13 14 15 | 16 17 18 19 20 21 22 23 24 25 26 27 28 29 30 31 |
|---|---|
| Source Port | Destination Port |
| Segment Length | Checksum |

FIG. 9

| ITEM NUMBER | PROTOCOL TYPE | INFORMATION | CONDITION | |
|---|---|---|---|---|
| 1 | IPv6 | Traffic Class | STORED VALUE IS 0 | |
| 2 | | Flow Label | STORED VALUE IS 0 | |
| 3 | | Payload Length | STORED VALUE IS 255 OR LESS | |
| 4 | | Hop Limit | STORED VALUE IS 1, 63, 64, 253, OR 254 | |
| 5 | | Source Address | SOURCE ADDRESS IS LINK LOCAL | |
| | | | SOURCE ADDRESS IS LINK LOCAL AND EIA | |
| | | | SOURCE ADDRESS IS LINK LOCAL AND EIA, AND MAC ADDRESS IS WIRELESSLY TRANSMITTED | |
| 6 | | Destination Address | UNICAST | DESTINATION ADDRESS IS LINK LOCAL, AND SOURCE AND DESTINATION BELONG TO SAME VENDER |
| | | | | DESTINATION ADDRESS IS LINK LOCAL AND EIA |
| | | | | HEAD OCTET OVERLAPS SOURCE ADDRESS OVER 4 OCTETS OR MORE |
| | | | MULTICAST | FLAG SCOPES ARE THE SAME |
| | | | | GROUP IDENTIFICATIONS ARE SAME OVER 2 OCTETS OR MORE |
| 7 | IPv6 FRAGMENT | Identification | STORED VALUE IS REPRESENTED BY 24 BITS OR LESS | |
| | | | STORED VALUE IS REPRESENTED BY 16 BITS OR LESS | |
| | | | STORED VALUE IS REPRESENTED BY 8 BITS OR LESS | |
| 8 | UDP | Destination Port | PORT NUMBER IS WITHIN PREDEFINED RANGE | |
| 9 | | Source Port | PORT NUMBER IS WITHIN PREDEFINED RANGE | |
| | | | SOURCE PORT IS SAME AS DESTINATION PORT | |
| | | | DIFFERENCE BETWEEN SOURCE PORT AND DESTINATION PORT IS WITHIN 255 | |
| 10 | | Checksum | CHECKSUM CALCULATABLE/ UNCALCULATABLE | |
| 11 | | Segment Length | STORED VALUE IS 255 OR LESS | |

FIG.10

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | IPv6 Version | | | | qos_comp | | nexthead_comp | hoplimit comp | | payload_comp | sa_mode | | m_flag | da_mode | | |

| ITEM NUMBER | INFORMATION | CONTENTS | STORED VALUE |
|---|---|---|---|
| 1 | IPv6 Version | VERSION | 0x7 |
| 2 | qos_comp | QoS INFORMATION COMPRESSION INFORMATION | 0:not comp(full)<br>1:ECN+FL(3byte)<br>2:DSCP(1byte)<br>3:0byte |
| 3 | nexthead_comp | NEXT PROTOCOL COMPRESSION INFORMATION | 0:not comp<br>1:comp |
| 4 | hoplimit_comp | HOP INFORMATION COMPRESSION INFORMATION | 0:not comp<br>1:1<br>2:63-64<br>3:254-255 |
| 5 | payload_comp | PAYLOAD LENGTH COMPRESSION INFORMATION | 0:not comp<br>1:255 OR LESS |
| 6 | sa_mode | SOURCE ADDRESS COMPRESSION INFORMATION | 0:not comp<br>1:112bits (link local : NOT_EIA)<br>2:96bits (link local : EIA)<br>3:48bits (EIA+MAC ADDRESS TRANSPARENT) |
| 7 | m_flag | MULTICAST FLAG | 0:not multicast<br>1:multicast |
| 8 | da_mode | DESTINATION ADDRESS COMPRESSION INFORMATION | 0:not comp<br>1:24bits (link local same vendor)<br>2:96bits (link local)<br>3:64bits (same prefix source)<br>4:48bits<br>5:32bits<br>6:16bits<br>7:8bits |

| ITEM NUMBER | INFORMATION | CONTENTS | STORED VALUE |
|---|---|---|---|
| 1 | nexthead_comp | NEXT PROTOCOL COMPRESSION INFORMATION | 0:not comp, 1:comp |
| 2 | ID_comp | Ideintififation COMPRESSION INFORMATION | 0:not comp(full), 1:24 bits, 2:16 bits, 3:8 bits |
| 3 | flag | FRAGMENT FLAG | 0:not fragment, 1:fragment |
| 4 | fragment offset | FRAGMENT OFFSET | FRAGMENT OFFSET |

FIG.12

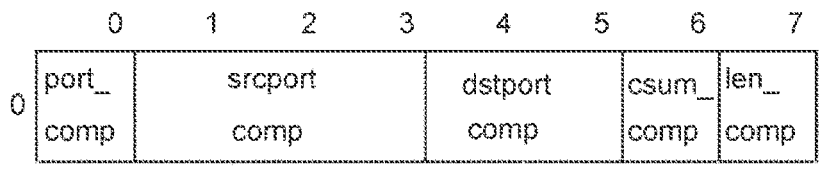

| ITEM NUMBER | INFORMATION | CONTENTS | STORED VALUE |
|---|---|---|---|
| 1 | port_comp | PORT NUMBER COMPRESSION FEASIBILITY/UNFEASIBILITY INFORMATION | 0:not comp, 1:comp |
| 2 | srcportcomp | SOURCE PORT NUMBER COMPRESSION INFORMATION | 0:not comp, 1-3:User Set Point 4:dst port same, (DESTINATION PORT IS SAME AS SOURCE PORT) 5:dst port differ less than plus 255, 6:dst port differ less than minus 255, |
| 3 | dstportcomp | DESTINATION PORT NUMBER COMPRESSION INFORMATION | 0:not comp, 1-3:User Set Point ( IN CASE OF 1=50000, 2=60000, OR 3=30000, IF VALUE OF PORT IS 30001, STORED VALUE IS SET 3, AND PORT INFORMATION CAN BE COMPRESSED BY 1 BYTE) |
| 4 | csum_comp | CHECKSUM COMPRESSION INFORMATION | 0:not comp, 1:comp (IN CASE OF 1, CHECKSUM IS CALCULATED AND REGENERATED ON RECEPTION SIDE) |
| 5 | len_comp | PAYLOAD LENGTH COMPRESSION INFORMATION | 0:not comp, 1:255 OR LESS |

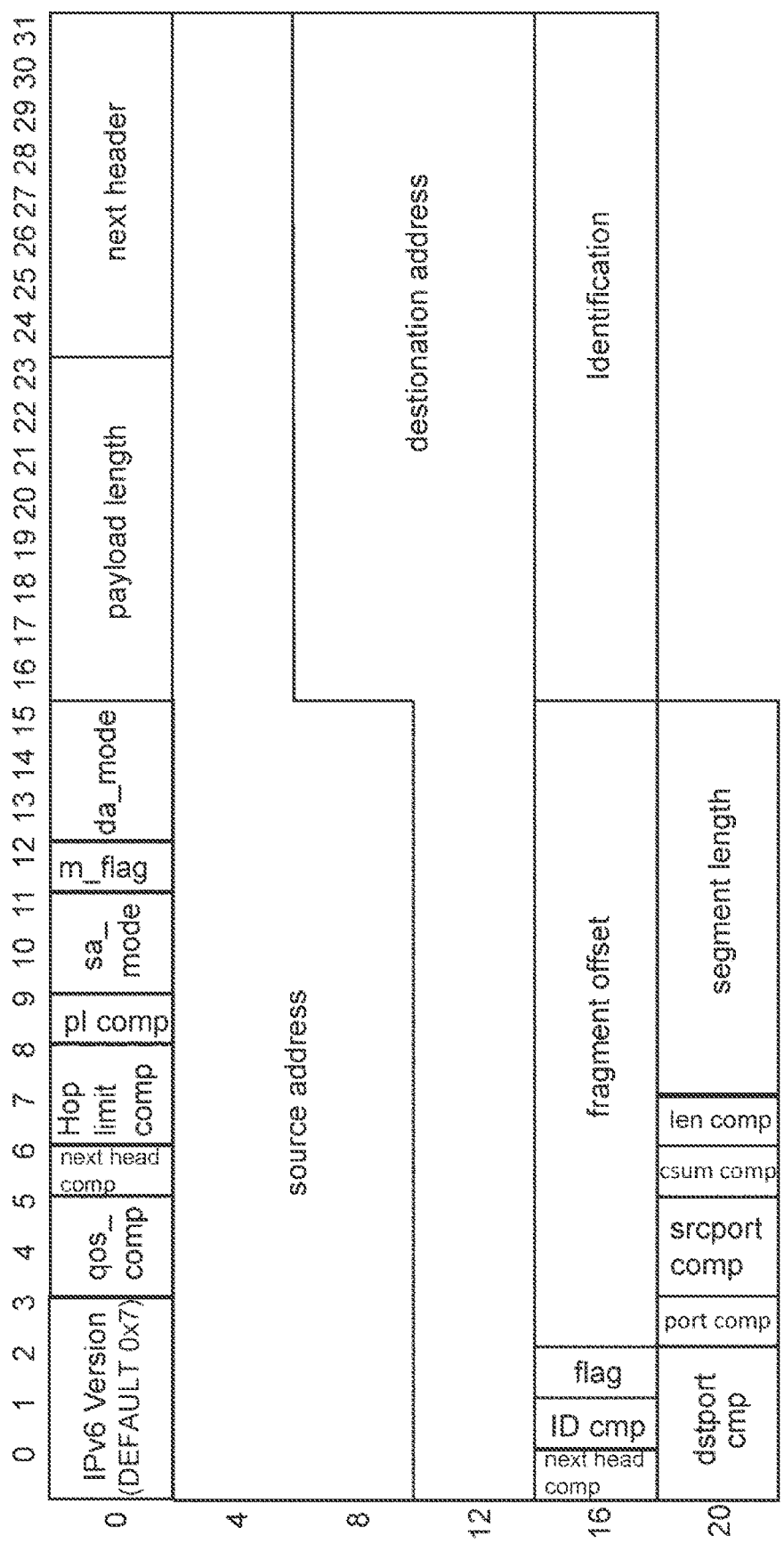

COMMUNICATION DEVICE

TECHNICAL FIELD

This disclosure relates to communication devices, and, for example, this disclosure can be applied to a communication device used in an IPv6 network.

BACKGROUND ART

As one of recent network communication methods, IP (Internet Protocol) has been used in the Internet (WEB) and e-mail. A communication method that is widespread today is IPv4 (Internet Protocol version 4) except for communication methods used for certain broadband circuits, and a 32-bit address (IP address) is used for showing a source or a destination. In the Internet communication, the global IP address scheme in which this IP address is uniquely assigned to each source or each destination is adopted, and each source or each destination is distinguished according to this uniquely assigned global IP address. However, the world of the Internet has been spreading very rapidly, and now the whole coverage range that can be defined by the 32 bits of an IPv4 address has already been used up, so that new addresses cannot be assigned under present circumstances. In other words, there is a problem in that the global addresses have been depleted.

In order to solve the above problem, IETF (Internet Engineering Task Force) proposes the usage of IPv6 (Internet Protocol version 6) in which an IP address is extended so that the length of the IP address is 128 bits instead of 32 bits and recommends a shift from IPv4 to IPv6 as the next generation communication method.

In wireless networks, a communication method referred to as Mobile IP according to WiMAX (Worldwide Interoperability for Microwave Access) is adopted. However, a system using Mobile IP becomes complicated, and the usage of broadband circuits is required, so that it is not easy to use Mobile IP, and Mobile IP has not become widely used in general wireless circuits such as a wireless LAN under present circumstances.

With such a background, there is a situation where networks and communications using IPv6 will be used gradually in the field of simplified or broadband wireless networks in the future, whereas both control information and usage rate of wireless networks increase owing to the expansion of address information and there arises a fear that data volumes that users have to transmit to the relevant destinations under normal circumstances are restricted.

Although a communication method referred to as 6Low-PAN is uniquely specified while the above-mentioned fear is born in mind and the reduction of information volume is being practiced in a PAN (Personal Area Network) compliant with BLE (Bluetooth Low Energy) or the like, it is required that all communication devices have to be compliant with this communication scheme when this communication method is used, communication partners have to be small-sized owing to the characteristics of the PAN, and reduction processing has to be done using information of BLE protocol that is a kind of a datalink layer protocol in order to use this communication scheme, so that it is impossible to apply this scheme to middle-sized networks and broadband networks.

CITATION LIST

Patent Literature

PLT 1: Japanese Patent Application Laid-Open No. 2016-25401

SUMMARY OF INVENTION

Technical Problem

As described before, while the shift to the IPv6 networks is being accelerated, traffic to wireless networks is expected to increase, so that, because the existing scheme performs the reduction processing of information volume using a small-sized BLE scheme, this scheme cannot be applied to middle-sized and large-sized networks. Because various types of communication devices are used in the middle-sized and large-sized networks, there is a possibility that low-performance communication devices cannot perform the reduction processing of information volume, so that it becomes necessary to adopt optimal traffic restriction while taking consideration to communication devices that cannot perform information compression processing.

An object of the present invention is to provide a communication device capable of executing optimal traffic restriction while taking consideration to communication devices that cannot perform information compression processing.

Problems other than the above and new features will be explicitly shown by the descriptions of this specification and the accompanying drawings.

Solution to Problem

The outline of a typical communication device among communication devices according to this disclosure can briefly be described as follows.

To put it concretely, this communication device is used in a wireless system that includes plural communication devices and executes communication via at least one of the plural communication devices. This communication device includes: first means for judging whether communication control information can be compressed or not on the basis of a neighboring node search message among the plural communication devices and a response thereto, or the exchange of routing control information according to an ad hoc routing protocol; and second means for compressing the information volume of the communication control information by judging the contents of the communication control information and deleting or replacing redundant information or constantly fixed information if the communication control information can be compressed.

Advantageous Effects of Invention

According to the above-mentioned communication device, it becomes possible to execute optimal traffic restriction while taking consideration to communication devices that cannot perform information compression processing.

BRIEF DESCRIPTION OF DRAWINGS

FIG. 6 is a diagram for explaining IPv6 header information.

FIG. 7 is a diagram for explaining IPv6 fragment header information.

FIG. 8 is a diagram for explaining UDP header information.

FIG. 9 is a diagram for explaining an example of compression algorithm information.

FIG. 10 is a diagram for explaining an example of compressed IPv6 header information.

FIG. 12 is a diagram for explaining an example of compressed UDP header information.

FIG. 14 is a diagram for explaining an example of all kinds of header information after compression.

DESCRIPTION OF EMBODIMENTS

A communication device according to an embodiment includes a function regarding the management and restriction of communication traffic in IPv6 communication or relay (routing) in the field of wireless communication. In this embodiment, it becomes possible that control information is compressed, and traffic is restricted by deleting and replacing the control information (header information) such as IPv6 address information. In addition, it is judged whether each communication device is a communication device the header information of which can be compressed or not, and only wireless transmission is performed on devices the header information of which cannot be compressed without executing compression, so that the service interruption on a network can be prevented from occurring.

EXAMPLE

An example will be explained with reference to the accompanying drawings hereinafter. In the following descriptions, the same reference signs are given to the same components, and repetitive descriptions about them might be omitted.

Figure 1:
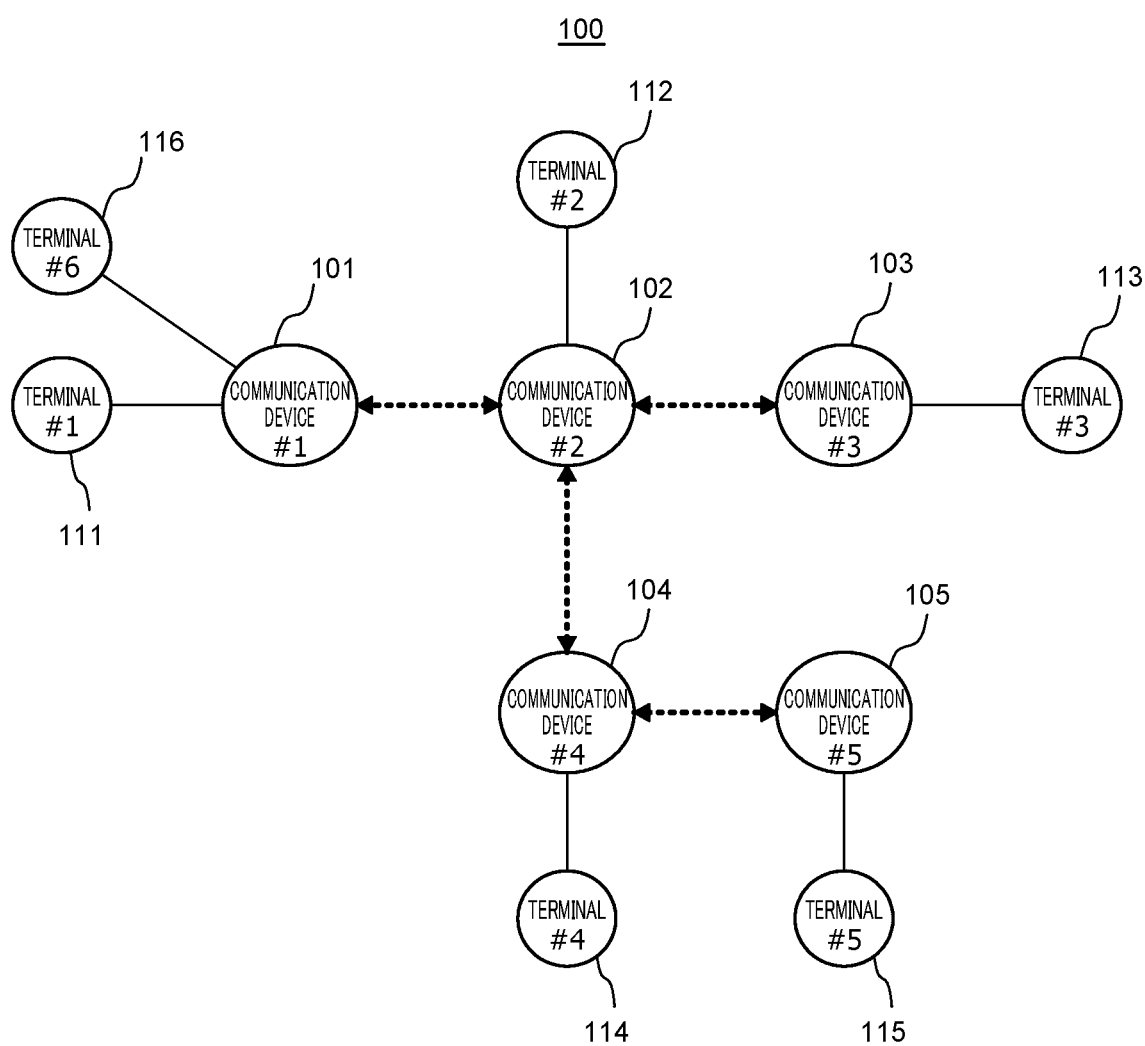
FIG. 1 is a diagram for explaining the configuration of a network.

A configuration example of a network will be explained with reference to FIG. 1. FIG. 1 is a diagram showing the configuration of the network. The network 100 includes a communication device #1 (101), a communication device #2 (102), a communication device #3 (103), a communication device #4 (104), and a communication device #5 (105).

On the network 100, an ad hoc network (a wireless network shown by dashed-line two-headed arrows) is composed of the communication devices #1 to #5 (101 to 105), and the communication devices #1 to #5 (101 to 105) are connected to terminals #1 to #5 (111 to 115) respectively via a wired autonomous network (shown by solid lines). Furthermore, the communication device #1 (101) is connected to a terminal #6 (116). The communication devices #1 to #5 (101 to 105) are communication devices that connect the wired autonomous network and the wireless network to each other.

Figure 2:
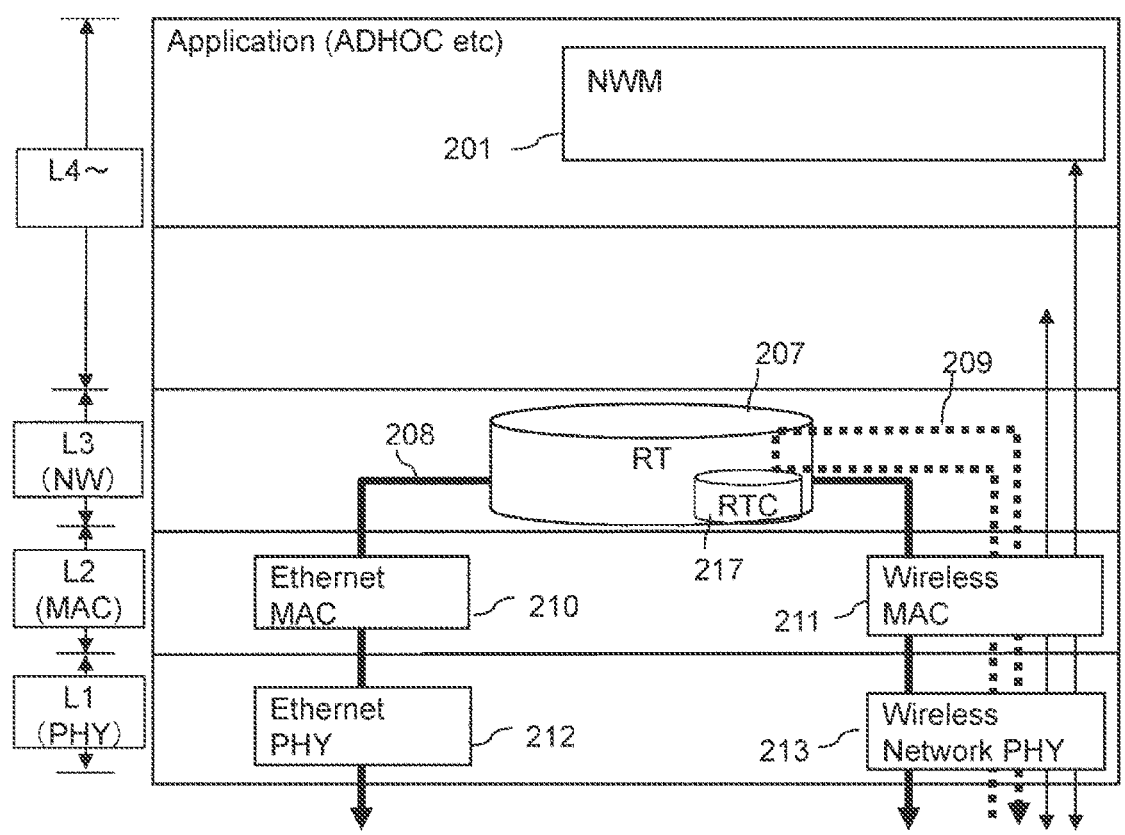
FIG. 2 is a diagram for explaining the configuration of a communication device according to a comparative example.
Figure 3:
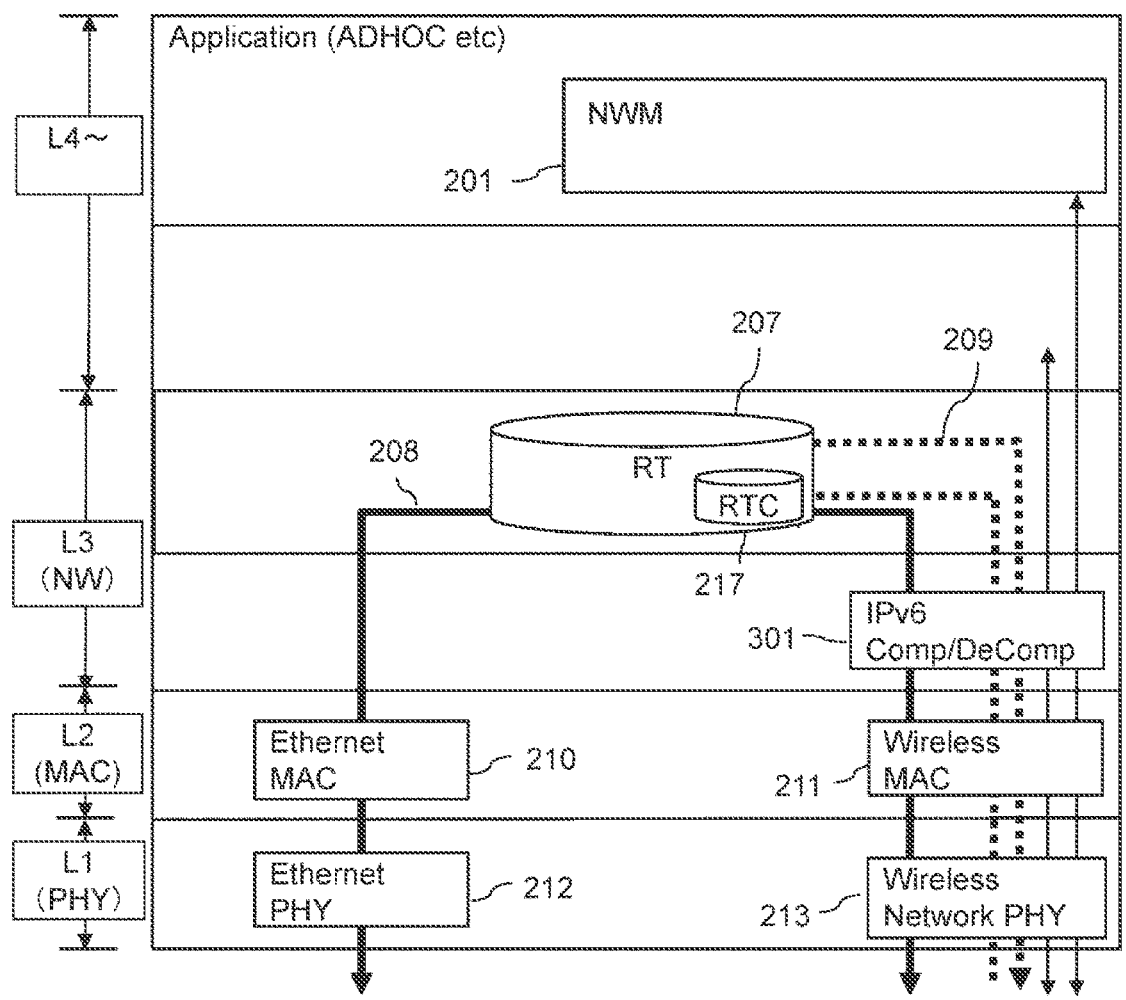
FIG. 3 is a diagram for explaining the configuration of a communication device according to an example.

Next, a configuration example of a communication device will be explained with reference to FIG. 2 and FIG. 3. FIG. 2 is a diagram showing the configuration of a communication device according to a comparative example. FIG. 3 is a diagram showing the configuration of a communication device according to an example.

As shown in FIG. 2, in the communication device 200 according to the comparative example, a network module (NWM) 201 for implementing ICMPv6 (Internet Control Message Protocol for IPv6) and an ad hoc routing protocol (a wireless network routing protocol) is disposed in and above a transport layer that is the layer 4 (L4), and a routing table (RT) 207 is disposed in a network (NW) layer that is the layer 3 (L3). In addition, the MAC layer (Ethernet MAC) 210 of a wired network and the MAC layer (Wireless MAC) 211 of a wireless network are disposed in a media access control (MAC) layer that is the Layer 2 (L2), and the PHY layer (Ethernet PHY) 212 of the wired network and the PHY layer (Wireless Network PHY) of the wireless network are disposed in a physical (PHY) layer that is the layer 1 (L1).

On receiving an IPv6 packet from the wired autonomous network, the communication device 200 checks communication routes registered in the routing table 207 of its own. As a result of this check, if there is a communication route corresponding to the destination IP address of the IPv6 packet in the routing table 207 of the communication device 200, the communication device 200 outputs the IPv6 packet to an output interface set at the time of setting the communication route. Here, the IPv6 packet is composed of an IPv6 header and a payload (an extension header and data).

Furthermore, the routing table 207 works on an IPv6 packet input from an interface on the wireless network side in the same way. In this case, the output destination of the route registered in the routing table 207 can be an interface on the wired autonomous network side or an interface on the wireless network side accordingly. In addition, the communication device 200 has a function of storing information about a route corresponding to input data in a temporary memory area (a routing table cache (RTC)) 217.

Next, as shown in FIG. 3, the communication device 300 according to the example includes an IPv6 Comp/DeComp (IP6CD) module 301 for compressing and decompressing IPv6 header information and the like in the NW layer in addition to the configuration of the communication device according to the comparative example. The IP6CD module 301 is built by, for example, software. Therefore, the communication device 300 includes a CPU for executing the software and a memory for storing the software.

Figure 4:
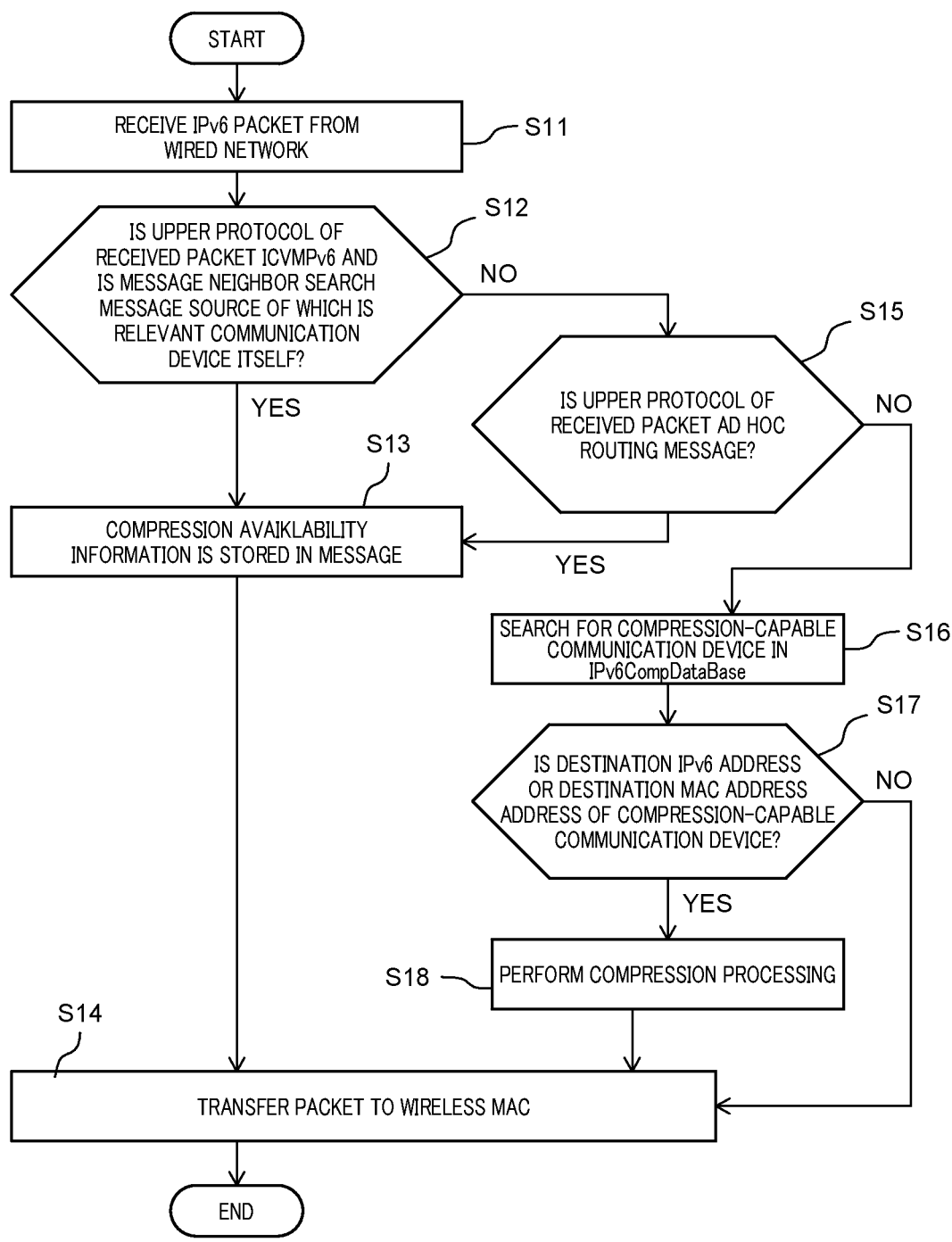
FIG. 4 is a diagram for explaining the wireless transmission processing of the communication device shown in FIG. 3.
Figure 5:
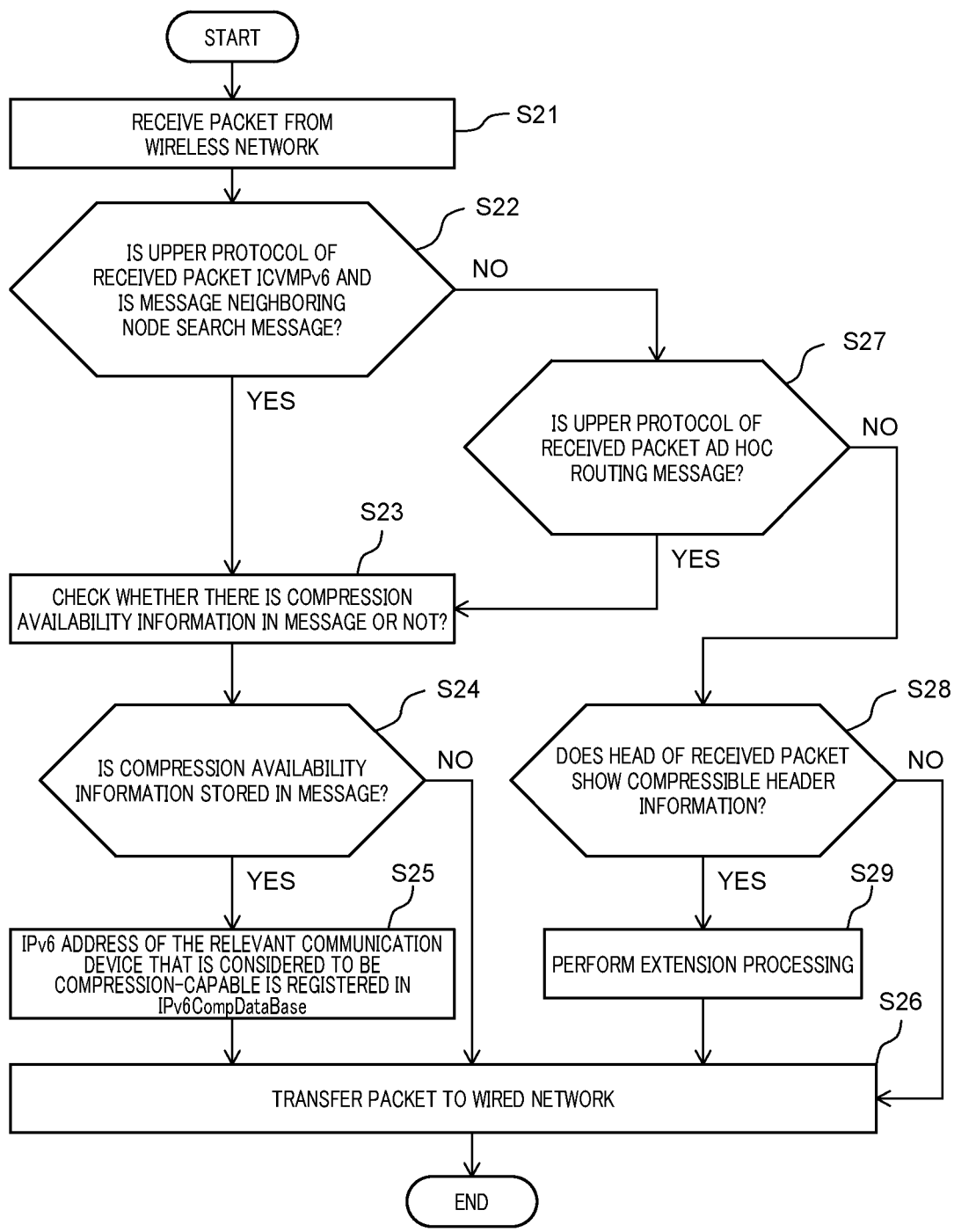
FIG. 5 is a diagram for explaining the wireless reception processing of the communication device shown in FIG. 3.

Next, processing regarding an information notification and judgment whether compression can be executed on the IPv6 header of the communication device 300 or not will be explained with reference to FIG. 4 and FIG. 5. FIG. 4 is a flowchart showing the wireless transmission processing of the communication device shown in FIG. 3. FIG. 5 is a flowchart showing the wireless reception processing of the communication device shown in FIG. 3.

As shown in FIG. 4, the IP6CD module 301 receives an IPv6 packet from the wired network (at step S11). Next, the IP6CD module judges whether or not the input information (the upper protocol of the received IPv6 packet) is a neighboring node search message that is compliant with ICMPv6 and the source of which is a communication device to which the IP6CD module 301 itself belongs (at step S12). If the input information is the neighboring node search message (Yes at step S12), the IP6CD module 301 stores information to the effect that the communication device to which the IP6CD module 301 itself belongs is compression-capable in the payload information in the message (at step S13). Subsequently the IP6CD module 301 outputs (transfers) the IPv6 packet to the MAC layer 211 of the wireless network and downward, and wirelessly transmits the IPv6 packet (at step S14). If judgment at step S12 is NO, whether the upper protocol of the received IPv6 packet is an ad hoc routing message or not is judged (at step S15), and if the result of the judgment is YES, the flow proceeds to step S13. With this, the communication device 300 can executes the transmission of the neighboring node search message or the ad hoc routing message after attaching information showing that the communication device 300 itself can compress IPv6 header information to the neighboring node search message or the ad hoc routing message.

On the other hand, in the case of the wireless reception processing, the IP6CD module 301 receives an IPv6 packet from the wireless network as shown in FIG. 5 (at step S21). Next, the IP6CD 301 judges whether data (the upper protocol of the received IPv6 packet) input from the MAC layer 211 of the wireless network is a neighboring node search message compliant with ICMPv6 or not (at step S22), and if the data is the neighboring node search message (Yes at step S22), whether or not information to the effect that the relevant communication device is compression-capable (compression availability information) is stored in the neighboring node search message is checked (at step S23). After whether or not the compression availability information is stored in the neighboring node search message is judged (at step S24), if the compression availability information is stored (YES at step S24), the fact that the IPv6 header information of the IPv6 packet to be transmitted to a target communication device can be compressed (the IPv6 address of the relevant communication device that is considered to be compression-capable) is registered in an IPv6 compression database (IPv6CompDataBase) (at step S25). Subsequently, the IPv6 packet is transferred to the wired network (step S26). If the answer at step S24 is NO, the flow proceeds to step S26.

This processing regarding neighboring node check processing according to an upper ad hoc routing is performed in the same way as above (if judgment at step S22 is NO, whether or not the upper protocol of the received packet is an ad hoc routing message is judged (at step S27), and if the result of the judgment at step S27 is YES, the flow proceeds to step S23).

After the above processing is performed, in the case where an IPv6 packet is input into the communication device 300 from the wired autonomous network, judgment at step S12 becomes NO, and judgment at step S15 also becomes NO. Subsequently, the contents of the IPv6 compression database is checked (compression-capable communication devices are searched for in the IPv6compression database) (at step S16), and whether or not the destination IPv6 address or destination MAC address of the IPv6 packet is the address of a compression-capable communication device is judged (at step S17). If the destination of the IPv6 packet shows a compression-capable communication device or a communication device that relays the IPv6 packet is a compression-capable communication device (if the result of the judgment at step S17 is YES), the compression processing of the IPv6 header information is performed (at step S18). Subsequently the IPv6 packet is output (transferred) to the MAC layer 211 of the wireless network and downward, and then wirelessly transmitted (at step S14). With this, it becomes possible that compressed IPv6 packets are transmitted to only compress-capable communication devices.

In the case where an IPv6 packet is input into the communication device 300 from the wireless network, judgment at step S22 becomes NO, and judgment at step S27 also becomes NO. As a result, whether the head of the received IPv6 packet shows compressible header information or not is judged (at step S28). If the head of the IPv6 packet shows the compressible header information (YES at step S28), the extension processing of the IPv6 packet is performed (at step S29), and the IPv6 packet is transferred to the wired network (at step S26). If the result of the judgment at step S28 is NO, the IPv6 packet is transferred to the wired network (at step S26).

Figure 11:
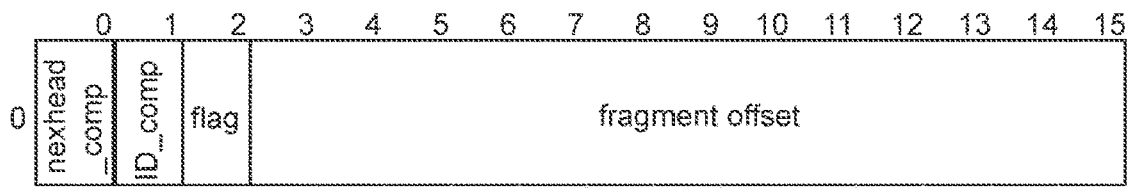
FIG. 11 is a diagram for explaining an example of compressed IPv6 fragment header information.
Figure 13:
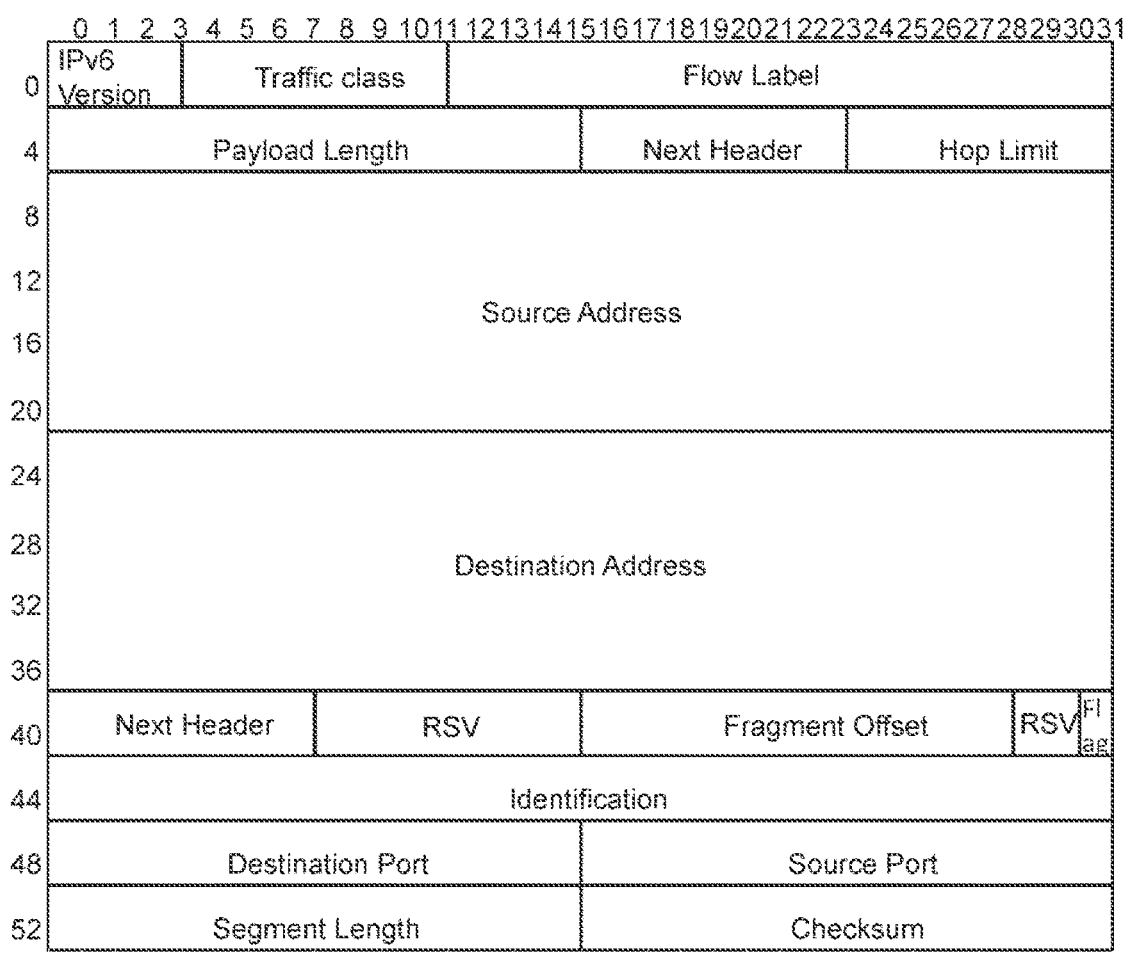
FIG. 13 is a diagram for explaining an example of all kinds of header information before compression.

Next, the compression processing at step S18 will be explained with reference to FIGS. 6 to 14. FIG. 6 is a diagram showing IPv6 header information. FIG. 7 is a diagram showing IPv6 fragment header information. FIG. 8 is a diagram showing UDP header information. FIG. 9 is a diagram showing an example of compression algorithm information. FIG. 10 is a diagram showing an example of compressed IPv6 header information. FIG. 11 is a diagram showing an example of compressed IPv6 fragment header information. FIG. 12 is a diagram showing an example of compressed UDP header information. FIG. 13 is a diagram showing an example of all kinds of header information before compression. FIG. 14 is a diagram showing an example of all kinds of header information after compression.

As an example of an IPv6 packet, an IPv6 packet including an IPv6 fragment header and a UDP header as extension headers as well as an IPv6 header will be explained hereinafter. Here, in the IPv6 packet, payload information is stored after the extension headers.

As shown in FIG. 6, the length of the IP6 header is 320 bits (40 octets), and the IPv6 header includes the field of a version (IPv6 Version) of 4 bits, the field of a traffic class (Traffic Class) of 8 bits, a flow label (Flow Label) of 16 bits, the field of a payload length (Payload Length) of 16 bits, the field of a next header (Next Header) of 8 bits, the field of a hop limit (Hop Limit) of 8 bits, the field of a source address (Source Address) of 128 bits, and the field of a destination address (Destination Address) of 128 bits.

"0110 (binary number representation)" is stored in the version (IPv6 Version).

Information for specifying a QoS (Quality of Service) at the time of transmitting the packet and showing a priority at the time of transmitting the packet is stored in the traffic class (Traffic Class).

Information for securing the qualities of communication routes and preferentially selecting routes in a multicast communication and the like is stored in the flow label (Flow Label).

Information for specifying the sum of the sizes of extension headers and payload data is stored in the payload length (Payload Length).

Information for showing the type of an extension header and an upper protocol, which succeed this IPv6 header, is stored in the next header (Next Header). If there are plural extension headers, information for showing the type of the first extension header is stored. The subsequent headers are disposed in a row.

The maximum number of routers that a packet can pass is stored in the hop limit (Hop Limit). Every time the packet passes one router, the number stored in the hop limit is decremented. When the number of the hop limit becomes zero, the packet is discarded, and "hop limit exceeded in transit" stipulated by ICMPv6 is sent back to the source of the packet.

The IPv6 address of the source node is stored in the source address (Source Address). The IP address of the destination node is stored in the destination address (Destination Address).

The IPv6 fragment header is a header used by a source for transmitting a packet larger than a path MTU (Maximum Transmission Unit) to a destination. The IPv6 fragment header is identified by the next header value "44" of the last header, and the IPv6 fragment header has a format shown in FIG. 7.

The length of the IP6 fragment header is 64 bits, and the IP6 fragment header includes the field of a next header (Next Header) of 8 bits, the field of a reservation (RSV) of 8 bits, the field of a fragment offset (Fragment Offset) of 13 bits, the field of a reservation (RSV) of 2 bits, the field of a flag (Flag) of 1 bit, and the field of an identification (Identification) of 32 bits.

Information for identifying the initial header type of the fragmentable portion of an original packet is stored in the next header (Next Header). The two fields of the reservations (RSVs) are initialized to become zero when the packet is transferred, and the two fields are ignored when the packet is received.

An unsigned integer that is the offset of data that succeeds this header is stored in the fragment offset (Fragment Offset) in which the offset is measured in 8-octet units and a relative value to the start of the fragmentable portion of the original packet.

Fragment information is stored in the flag (Flag). If there is a subsequent fragment or there are subsequent fragments, "1" is stored in the flag, and if the relevant fragment is the last fragment, "0" is stored in the flag.

The identification numbers of fragmented packets are stored in the identification (Identification). All the packets obtained by fragmenting the original packet have the same identifications. On the basis of these identifications, the original packet is identified and restored.

As shown in FIG. 8, the length of the UDP header is 64 bits, and the UDP header includes the field of a source port number (Source Port) of 16 bits, the field of a destination port number (Destination Port) of 16 bits, the field of a segment length (Segment Length) of 16 bits, and the field of a checksum (Checksum) of 16 bits.

A number for identifying an application of the source is stored in the source port number (Source Port). In the case of a UDP packet that does not require a reply, the source port number is set zero. A number for identifying an application of the destination is stored in the destination port number (Destination Port).

Information showing the length of the UDP packet is stored in the segment length (Segment Length). In other words, the number of bytes including the length of data part transmitted according to UDP is stored.

Check data for checking the consistency of the UDP packet is stored in the checksum (Checksum).

The compression processing of the IPv6 header, the IPv6 fragment header, and the UDP header are performed according to compression algorithm information described in FIG. 9. If any of the contents of the IPv6 header, the IPv6 fragment header, and the UDP header respectively shown in FIG. 6 to FIG. 8 coincides with one of the contents (conditions) of the compression algorithm information shown in FIG. 9, compression processing and data replacement processing are performed on the relevant content.

In the case where the compression processing and data replacement processing are performed, a compression information header (compressed header fixed portion) shown in FIG. 10 to FIG. 12 is disposed before an already-compressed header (compressed header variable portion).

As shown in FIG. 10, the length of a compression information IPv6 header is 16 bits, and the compression information IPv6 header includes the field of a version (IPv6 Version) of 4 bits, the field of QoS information compression information (qos_comp) of 2 bits, the field of next protocol compression information (nexthead_comp) of 1 bit, the field of hop information compression information (hoplimit-_comp) of 2 bits, the field of a payload length compression information(payload comp) of 1 bit, the field of source address compression information (sa_mode) of 2 bits, the field of a multicast flag (m_flag) of 1 bit, and the field of destination address compression information (da_mode) of 3 bits.

Information (0×7) showing that this header is the compression information IPv6 header is stored in the version (IPv6 Version).

The compression information of the field of traffic class and the compression information of the field of flow label are stored in the QoS information compression information (qos_comp). DSCP (Differentiated Services Code Point) is stored in the upper 6 bits of the traffic class. The last 2 bits are used for a congestion control strategy referred to as ECN (Explicit Congestion Notification). ECN is composed of 2 bits one of which is referred to as ECT (ECN Capable Transport) and the other of which is referred to as CE (Congestion Experienced), and when a network is congested, ECN has the task of notifying a host that is engaged in data communication of the congestion before a device on the network actually begins to discard a packet. If storage values in the fields of the traffic class and the flow label are "0", "3" is stored in the QoS information compression information, and the fields of the traffic class and the flow label are compressed into 0 byte. If DSCP is stored in the traffic class, "2" is stored in the QoS information compression information, and the fields of the traffic class and the flow label are compressed into 1 byte. If ECN is stored in the traffic class and the flow label is stored, "1" is stored in the QoS information compression information and the fields of the traffic class and the flow label are compressed into 3 bytes. In the case where the fields of the traffic class and the flow label are not compressed, "0" is stored in the QoS information compression information, and the fields of the traffic class and the flow label are left as it is, that is, 28 bits.

The compression information of the field of the next header is stored in the next protocol compression information (nexthead_comp). If there is no next header, "1" is stored in the next protocol compression information, and the field of the next header is deleted. In the case where the field of the next header is not compressed, "0" is stored in the next protocol compression information and the length of the field of the next header is left as it is, that is, 8 bits.

The compression information of the field of the hop limit is stored in the hop information compression information (hoplimit_comp). If the stored value in the field of the hop limit is 254 or 255, "3" is stored in the hop information compression information and the field of the hop limit is deleted. If the stored value in the field of the hop limit is 63 or 64, "2" is stored in the hop information compression information and the field of the hop limit is deleted. Therefore, the value of the field of the hop limit is replaced with the hop information compression information. If the stored value of the field of the hop limit is "1", "1" is stored in the hop information compression information and the field of the hop limit is deleted. If the field of the hop limit is not compressed, "0" is stored in the hop information compression information and the length of the field of the hop limit is left as it is, that is, 8 bits.

The compression information of the field of the payload length is stored in the payload length compression information (payload comp). If the stored value of the field of the payload length is 255 or smaller, "1" is stored in the payload length compression information and the length of the field of the payload length is compressed into 8 bits. If the field of the payload length is not compressed, "0" is stored in the payload length compression information and the length of the field of the hop limit is left as it is, that is, 16 bits.

The compression information of the field of the source address is stored in the source address compression information (sa_mode). In the case where the address of the field of the source address is a link local address and EIA, and if MAC address is wirelessly transmitted (EIA+MAC ADDRESS TRANSPARENT), "3" is stored in the source address compression information, and the length of the field of the source address is compressed into 48 bits. If the address of the field of the source address is a link local address and EIA (link local: EIA), "2" is stored in the source address compression information, and the length of the field of the source address is compressed into 96 bits. If the address of the field of the source address is a link local address and not EIA (link local: NOT_EIA), "1" is stored in the source address compression information, and the length of the field of the source address is compressed into 112 bits. If the address of the field of the source address is not compressed, "0" is stored in the source address compression information, and the length of the field of the source address is left as it is, that is, 128 bits.

Information whether the destination address is a multicast address or not is stored in the multicast flag (m_flag).

The compression information of the field of the destination address is stored in the destination address compression information (da_mode). If the address of the field of the destination address is a unicast address and overlaps the source address over 120 bits (same prefix source), "7" is stored in the destination address compression information and the length of the field of the destination address is compressed into 8 bits. If the address of the field of the destination address is a unicast address and overlaps the source address over 112 bits, "6" is stored in the destination address compression information and the length of the field of the destination address is compressed into 16 bits. If the address of the field of the destination address is a unicast address and overlaps the source address over 96 bits, "5" is stored in the destination address compression information and the length of the field of the destination address is compressed into 32 bits. If the address of the field of the destination address is a unicast address and overlaps the source address over 80 bits, "4" is stored in the destination address compression information and the length of the field of the destination address is compressed into 48 bits. If the address of the field of the destination address is a unicast address and overlaps the source address over 64 bits, "3" is stored in the destination address compression information and the length of the field of the destination address is compressed into 64 bits. If the address of the field of the destination address is a unicast type link local address and EIA (link local), "2" is stored in the destination address compression information and the length of the field of the destination address is compressed into 96 bits. If the address of the field of the destination address is a unicast type link local address and the source and the destination belong to the same vender (link local same vender), "1" is stored in the destination address compression information and the length of the field of the destination address is compressed into 24 bits.

As shown in FIG. 11, the length of a compression information IPv6 fragment header is 16 bits, and the compression information IPv6 fragment header includes: the field of next protocol compression information (nexthead_comp) of 1 bit; the field of Identification compression information (ID_comp) of 1 bit; the field of a fragment flag (flag) of 1 bit; and the field of a fragment offset (fragment offset) of 13 bits.

The compression information of the field of the next header is stored in the next protocol compression information (nexthead_comp). If there is no next header, "1" is stored in the next protocol compression information and the field of the next header is deleted. If the field of the next header is not compressed, "0" is stored in the next protocol compression information and the length of the field of the next header is left as it is, that is, 8 bits.

The compression information of the field of the identification is stored in the Identification compression information (ID_comp). If the field of the identification is represented by 8 bits or less, "3" is stored in the Identification compression information and the length of the field of the identification is compressed into 8 bits. If the field of the identification is represented by 16 bits or less, "2" is stored in the Identification compression information and the length of the field of the identification is compressed into 16 bits. If the field of the identification is represented by 24 bits or less, "1" is stored in the Identification compression information and the length of the field of the identification is compressed into 24 bits. If the field of the identification is not compressed, "0" is stored in the Identification compression information and the length of the field of the identification is left as it is, that is, 32 bits.

Information whether there is the fragment or not is stored in the fragment flag (flag). The value of the field of the fragment offset is stored in the fragment offset (fragment offset).

As shown in FIG. 12, the length of a compression information UDP header is 8 bits, and the compression information UDP header includes: the field of port number compression feasibility/unfeasibility information (port_comp) of 1 bit; the field of source port number compression information (srcportcomp) of 2 bits; the field of destination port number compression information (dstportcomp) of 3 bits; the field of checksum compression information (checksum_comp) of 1 bit; and the field of payload length compression information (len_comp) of 1 bit.

Information whether at least one of the source port number and the destination port number can be compressed or not is stored in the port number compression feasibility/unfeasibility information (port_comp). If the port number is compressed, "1" is stored in the port number compression feasibility/unfeasibility information, and if the port number is not compressed, "0" is stored in the port number compression feasibility/unfeasibility information.

The compression information of the field of the source port number is stored in the source port number compression information (srcportcomp). If the port number is within a predefined range, for example, if the port number is 50000, "1" is stored in the source port number compression information (srcportcomp), if 60000, "2" is stored, if 30000, "3" is stored, if 30001, "3" is stored, and the port information is compressed into 1 byte. If the field of the source port number is not compressed, "0" is stored in the source port number compression information, and the field of the source port number is left as it is, that is, 2 bytes.

The compression information of the field of the destination port number is stored in the destination port number compression information (dstportcom). If the port number is within a predefined range, similar processing is performed as is the case with the source port number compression information. If the destination port number is the same as the source port number (dst port same), "4" is stored in the destination port number compression information and the destination port number is deleted. If 0<(the destination port number-(the source port number)<255 (dst port differ less than plus 255), "5" is stored in the destination port number compression information and the field of the destination port number is compressed into 1 byte. If 0>(the destination port number-(the source port number)>−255 (dst port differ less than mius 255), "6" is stored in the destination port number compression information and the field of the destination port number is compressed into 1 byte. If the field of the destination port number is not compressed, "0" is stored in the destination port number compression information, and the field of the destination port number is left as it is, that is, 2 bytes.

The compression information of the field of the checksum is stored in the checksum compression information (checksum_comp). If the field of the checksum is compressed, "1" is stored in the checksum compression information, and the field of the checksum is deleted. In this case, the checksum is calculated and regenerated on the reception side. If the field of the checksum is not compressed, "0" is stored in the checksum compression information, and the field of the checksum is left as it is, that is, 2 bytes.

The compression information of the field of the segment length is stored in the payload length compression information (len_comp). If the segment length is 255 or less, "1" is stored in the payload length compression information, and the field of the segment length is compressed into 1 byte. If the field of the segment length is not compressed, "0" is stored in the payload length compression information, and the field of the segment length is left as it is, that is, 2 bytes.

As shown in FIG. 13, the total length of all kinds of header information (IPv6 header, IPv6 fragment header, and UDP header) before compression is 56 bytes, and as shown in FIG. 14, the total length after compression is 22 bytes. Here, in FIG. 14, the lengths of the traffic class and the flow label are compressed into 0 byte; the length of the payload length is compressed into 1 byte; the length of the next header is compressed into 1 byte, the length of the hop limit is compressed into 0 byte, the length of the source address is compressed into 6 bytes, and the length of the destination address is compressed into 6 bytes. The length of the segment length is compressed into 1 byte.

A communication device, which receives an IPv6 packet including a compressed IPv6 header as shown in FIG. 14, performs extension processing on the basis of compression information headers as shown in FIGS. 10 to 12 and obtains an IP header, an IPv6 fragment header, and a UDP header as shown in FIG. 13.

Although the embodiment and example achieved by the inventors have been described in concrete terms so far, it goes without saying that the present invention is not limited to the above-described embodiment or example and various kinds of alternations can be executed on the above-described embodiment or example.

REFERENCE SIGNS LIST

100 . . . Network
101 . . . Communication Device
111 . . . Terminal
200 . . . Communication Device
201 . . . Network Module
207 . . . Routing Table
208 . . . Interface of Wired Autonomous Network
209 . . . Interface of Wireless Autonomous Network
210 . . . MAC Layer of Wired Network (Ethernet MAC)
211 . . . MAC Layer of Wireless Network (Wireless Network MAC)
212 . . . PHY Layer of Wired Network (Ethernet PHY)
213 . . . PHY Layer of Wireless Network (Wireless Network PHY)
217 . . . ROUTING TABLE CACHE (RTC)
301 . . . IPv6Comp/Decomp (IP6CD) Module

The invention claimed is:

1. A communication device used in a wireless system that includes a plurality of communication devices and executes communication via at least one of the plurality of communication devices, the communication device comprising:
   a processor coupled to a memory storing instructions that when executed configure the processor to:
   judge whether communication control information can be compressed or not on the basis of a neighboring node search message among the plurality of communication devices and a response thereto, or the exchange of routing control information according to an ad hoc routing protocol; and
   compress the information volume of the communication control information by judging the contents of the communication control information and deleting or replacing redundant information or constantly fixed information if the communication control information can be compressed,
   wherein the first means includes:
      store compression availability information to the effect that the communication device itself is a compression-capable communication device in the payload information of a neighboring node search message or an ad hoc routing message if the upper protocol of a received IPv6 packet is the neighboring node search message or the ad hoc routing message that is compliant with ICMPv6 and originated by the communication device itself;
      register the address of another communication device in a database taking the other communication device to be a compression-capable communication device if the compression availability information of the other communication device is stored in the message; and
      judge that, as a result of searching the database, if the destination IPv6 address or the destination MAC address of a communication device is compressible, the communication control information can be compressed.

2. The communication device according to claim 1, wherein the processor is further configured to compress information in a predefined field of the communication control information by deleting or replacing the information on the basis of a predefined compression algorithm and attach a compression information header showing the state of the compression before the compressed information in the predefined field to obtain the compressed communication control information.

3. The communication device according to claim 2, further comprising wherein the processor is further configured to extend the compressed communication control information if the head of the received IPv6 packet is the compression information header.

4. The communication device according to claim 3, wherein the processor is further configured to decompress the compressed communication control information into the communication control information on the basis of the compression information header.

\* \* \* \* \*